(No Model.)
J. F. KELLER.
BOOT AND ADJUSTABLE POINT FOR SEEDING MACHINES.
No. 269,944.　　　　　　　　Patented Jan. 2, 1883.
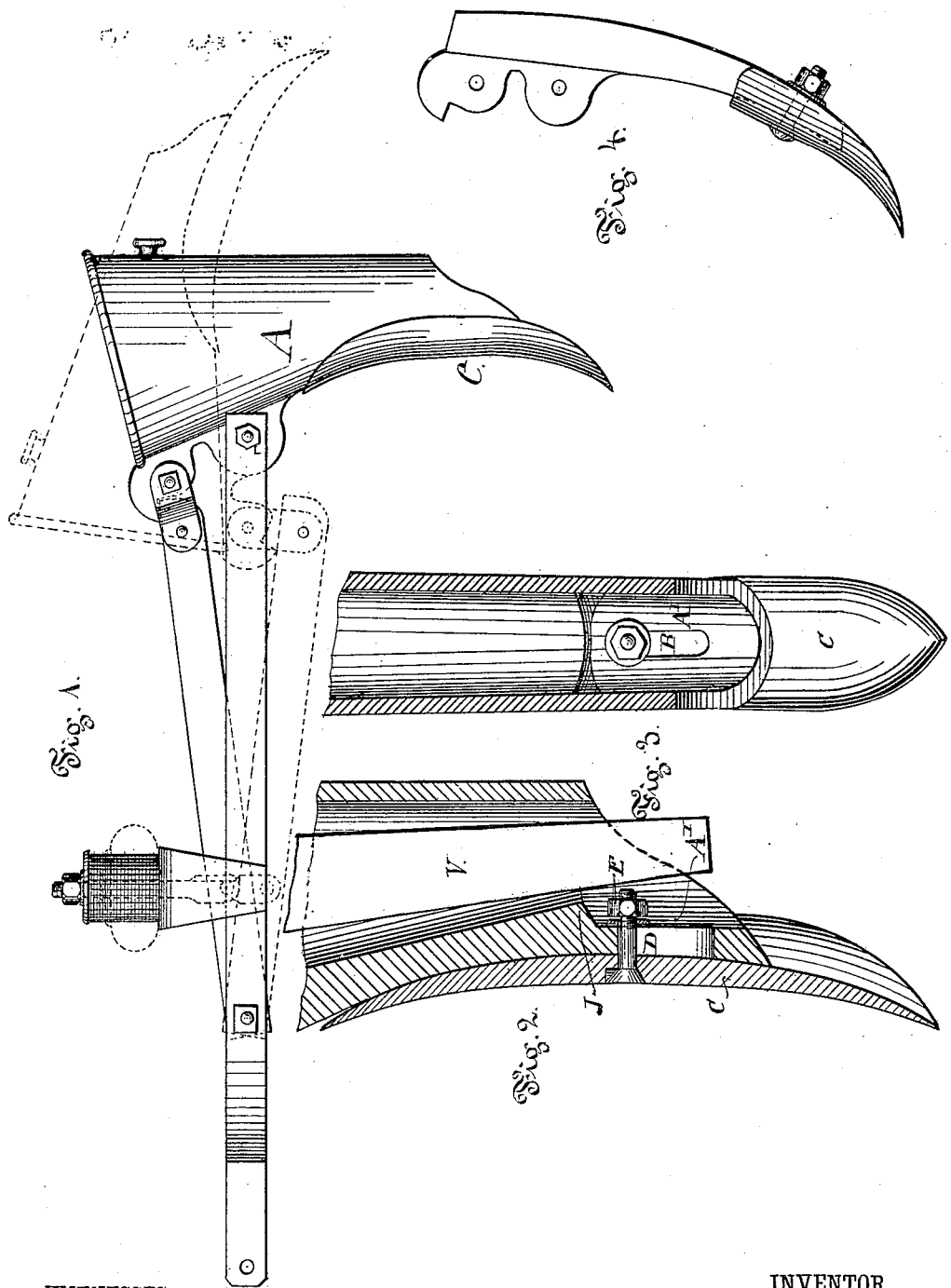
WITNESSES:　　　　　　　　　　INVENTOR.

United States Patent Office.

JOHN F. KELLER, OF MARTINSBURG, WEST VIRGINIA.

BOOT AND ADJUSTABLE POINT FOR SEEDING-MACHINES.

SPECIFICATION forming part of Letters Patent No. 269,944, dated January 2, 1883.

Application filed June 3, 1882. (No model.)

*To all whom it may concern:*

Be it known that I, JOHN F. KELLER, a citizen of the United States of America, residing at Martinsburg, in the county of Berkeley and State of West Virginia, have invented certain new and useful Improvements in Boots and Adjustable Points or Blades for Seeding-Machines, of which the following is a specification, reference being had therein to the accompanying drawings.

My invention consists of a novel construction of boot and the mode of attaching the hoe or point thereto in a grain-drill or seed-planter, and the same will be fully understood by the following description and claims.

In the accompanying drawings, Figure 1 is a side view of a boot, drag-bars, and gum spring. Figs. 2 and 3 are detached views. Fig. 4 represents an adjustable hoe and hoe-shank.

The boot A is cast with a slot, B, in the front thereof, in order to attach the hoe or point C by means of the bolt D and nut E. By this construction the point or hoe is adjustable vertically upon the boot without being detached therefrom, and it may be moved down when worn off at the point, and thus be long enough to be used again. The boot is cast with a flat surface, A', on the inside, so as to give a good bearing and room for a washer and nut, and also the wrench for turning the nut. The head of the bolt D is countersunk in the front of the hoe C, thus giving a smooth surface, so that dirt will not be caught and held on the front of the hoe; and the boot has a shoulder, J, on the inside projecting over the nut E, so as to direct the grain past the nut and prevent the nut from cutting or wearing the tube through which the grain falls to the ground.

The hoe C is made with two points, one at each end, so as to be reversible in a well-known way, and thus last twice as long as a hoe with but one point, and the farmer saves the time and expense of sharpening the hoe. He may also easily remove the hoe and sharpen the same, when necessary, by grinding or otherwise, and adjust the point lower down as the same becomes worn too short.

I am aware that cultivator-shanks have been made with a slot therein for the purpose of adjusting the hoe or point, and also that points on drill-boots have been made adjustable by means of a series of bolt-holes in the front part of the boot; but I believe that a drill-boot having a vertical slot in the front part thereof is a new device in grain-drills, and an important improvement; therefore, Having described my grain-drill, what I claim is—

1. As an improvement in grain-drills, a drill-boot having a slot, B, in the front part thereof, and adapted to carry the vertically-adjustable hoe C, substantially as and for the purposes set forth.

2. The described drill-boot A, having a vertical slot, B, in the front thereof, a flat bearing-surface, A', for the nut E, and an inwardly-projecting shoulder, F, whereby the falling grain is directed past said nut, which, having a free space around the same, is accessible for adjustment and removal, substantially as set forth and shown.

3. In a drill-boot, a vertical slot in the front thereof, in combination with the bearing-surface A' for the nut E, substantially as described.

4. In a drill-boot, a vertical slot in the front part thereof, in combination with the bolt D, nut E, and shoulder J, substantially as and for the purposes specified.

In testimony whereof I affix my signature in presence of two witnesses.

JOHN F. KELLER.

Witnesses:
JOHN T. ARMS,
DANIEL BREED.